(12) United States Patent
Ferguson et al.

(10) Patent No.: US 6,866,499 B2
(45) Date of Patent: Mar. 15, 2005

(54) BLOW MOLDED PLASTIC CONTAINER WITH INCLINED MOUTH AND METHOD AND APPARATUS FOR OBTAINING SAME

(75) Inventors: Gary Ferguson, Tallmadge, OH (US); Richard C. Darr, Medina, OH (US); Richard R. Dasch, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 176 days.

(21) Appl. No.: 10/426,078

(22) Filed: Apr. 29, 2003

(65) Prior Publication Data

US 2003/0185929 A1 Oct. 2, 2003

Related U.S. Application Data

(62) Division of application No. 10/052,841, filed on Jan. 15, 2002, now Pat. No. 6,692,682.

(51) Int. Cl.$^7$ .............................................. B29C 49/64
(52) U.S. Cl. ....................................... 425/525; 425/529
(58) Field of Search ................................. 425/525, 529

(56) References Cited

U.S. PATENT DOCUMENTS

| | | | | |
|---|---|---|---|---|
| 3,106,745 A | * | 10/1963 | King ............................ | 425/525 |
| 3,408,692 A | * | 11/1968 | Schaich ....................... | 425/532 |
| 3,508,295 A | * | 4/1970 | Hough ......................... | 425/525 |
| 3,608,017 A | * | 9/1971 | Cines .......................... | 264/529 |
| 3,781,395 A | * | 12/1973 | Uhlig .......................... | 264/530 |
| 3,806,300 A | * | 4/1974 | Hafele et al. ................ | 425/525 |
| 4,116,608 A | * | 9/1978 | Uhlig .......................... | 425/525 |
| 4,195,053 A | * | 3/1980 | Lambarth .................... | 264/533 |
| 5,069,614 A | * | 12/1991 | Belmont ...................... | 425/525 |
| 5,178,817 A | * | 1/1993 | Yamada et al. ............. | 264/532 |
| 5,215,694 A | * | 6/1993 | Bartimes et al. ............. | 264/68 |
| 6,315,939 B1 | * | 11/2001 | Mock et al. ................. | 264/454 |
| 6,319,574 B1 | * | 11/2001 | Slat ............................ | 428/35.7 |
| 6,814,922 B2 | * | 11/2004 | Mennel ....................... | 264/533 |

* cited by examiner

*Primary Examiner*—Suzanne E. McDowell
(74) *Attorney, Agent, or Firm*—Robert H. Bachman

(57) ABSTRACT

Method and apparatus for blow molding a plastic container with a mouth and neck portion thereof which is inclined or angled with respect to the body portion of the container, plus a plastic container having an inclined or angled mouth and neck portion.

8 Claims, 6 Drawing Sheets

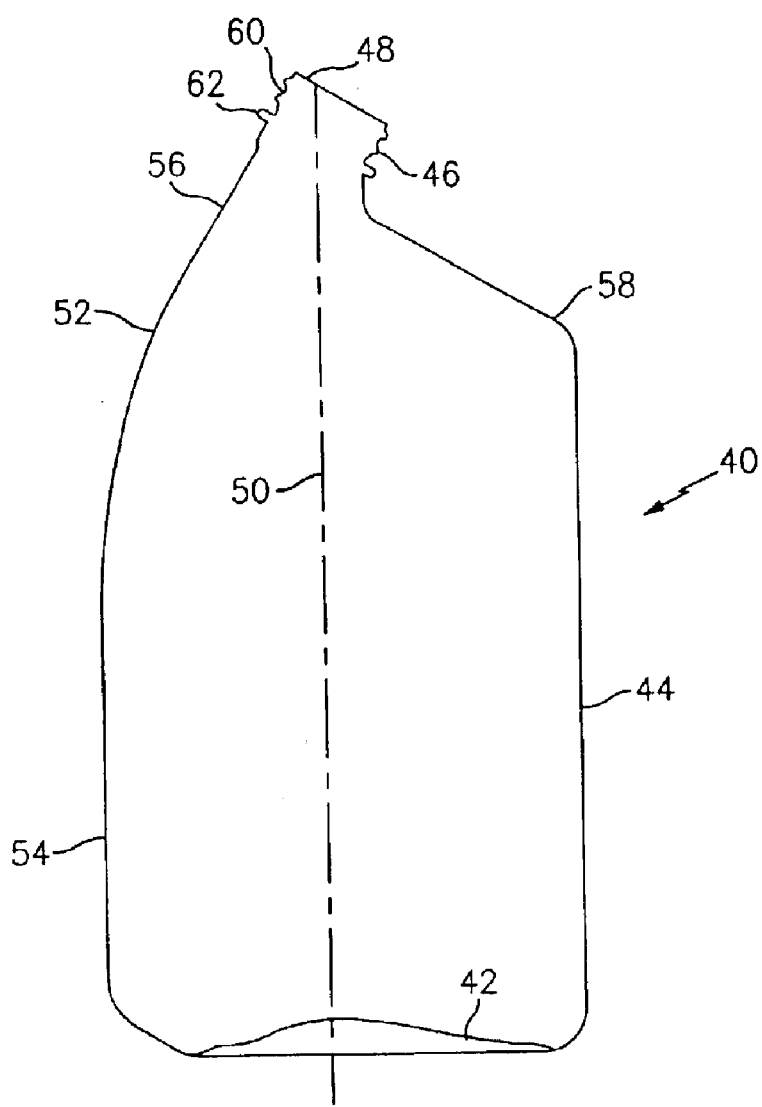
FIG. 7
  
FIG. 7A   FIG. 7B

BLOW MOLDED PLASTIC CONTAINER WITH INCLINED MOUTH AND METHOD AND APPARATUS FOR OBTAINING SAME

CROSS REFERENCE TO RELATED APPLICATION

This application is a Division, of application Ser. No. 10/052,841, filed Jan. 15, 2002 now U.S. Pat. No. 6,692,682.

BACKGROUND OF THE INVENTION

The present invention relates to a blow molded, plastic container having an inclined or angled mouth and neck portion, and a method and apparatus for preparing same.

Blow molded plastic containers, such as those made from polyethylene terephthalate, are widely used for many applications, such as, for example, as containers for drinks and cleaning products. These containers customarily have a straight mouth and neck portion, that is, a mouth and neck portion that are coaxial with the body portion of the container.

The preparation of these containers generally involves preparing a preform or parison with a mouth and neck portion that are coaxial with the preform body portion, holding the preform in a blow mold with the preform mouth and neck portion held coaxial with the preform body portion, and forming the desired container in the shape of the blow mold by stretching and blow molding.

For many applications it is desirable to prepare such a container with a mouth and neck portion at an angle to the body portion of the container. However, it is difficult to prepare such an angled mouth and neck portion container by conventional blow molding techniques. For example, such techniques may involve expensive and inconvenient multi-stage operations where an injected preform is clamped, stretched and blown in the mold at one station and a blow pin is inserted into the mold for blowing and/or compression molding at another station and the neck is bent at a subsequent station or in a subsequent stage of operation. Techniques such as this increase the cost of the container and complicate processing.

Alternatively, a conventional type apparatus cannot be satisfactorily used to mold a container with an angled mouth and neck portion since to do so would require the mold cavity to be aligned so that the desired angular neck is appropriately aligned with the blow pin. Significant processing problems result thereby, as well as problems with the resultant container.

Accordingly, it is a principal objective of the present invention to provide a new and improved method and apparatus for obtaining a blow molded, plastic container with an angled or inclined neck and mouth portion.

It is a still further objective of the present invention to provide an improved blow molded, plastic container with an angled or inclined neck and mouth portion.

It is an additional objective of the present invention to provide a method and apparatus as aforesaid which is easy and expeditious to use on a commercial scale, and which simply and conveniently provides improved containers as aforesaid.

Further objects and advantages of the present invention will appear hereinbelow.

SUMMARY OF THE INVENTION

In accordance with the present invention it has now been found that the foregoing objects and advantages are readily obtained.

The present invention provides a method of forming a blow molded plastic container, preferably polyethylene terephthalate although other plastic materials can be readily used, said container having a mouth and neck portion thereof which are inclined or angled with respect to the body portion of the container. The method comprises:

providing a straight, cylindrical plastic parison or preform having a closed base, straight body portion extending therefrom, straight neck portion extending from the body portion, and an open mouth;

placing said preform in a blow mold having the desired container configuration and clamping or holding the preform in place in the blow mold;

introducing a stretch rod into the preform and extending said preform substantially to the base of the blow mold with said stretch rod to provide an extended preform;

providing a blow nozzle with an angled face corresponding to the desired angle of the mouth and neck portion of the container, generally less than 45° with respect to the longitudinal axis of the container;

engaging said angled face of the blow nozzle with the open mouth of the preform and blending the open mouth and neck portion of the preform by the angled face of the blow nozzle to correspond to the angle of the face of the blow nozzle; and introducing high pressure air into the extended bent neck preform from the blow nozzle to stretch the extended bent neck preform into conformity with the shape of the blow mold and to provide a biaxially oriented container having an angled mouth and neck portion.

The apparatus of the present invention comprises:

a blow mold having the desired container configuration for holding in place therein a straight, cylindrical plastic parison or preform having a closed base, straight body portion extending from the base, straight neck portion extending from the body portion, and open mouth;

a stretch rod associated with the blow mold for introduction to the preform operative to extend the preform substantially to the base of the blow mold and provide an extended preform;

a blow nozzle associated with the blow mold having an angled face corresponding to the desired angle of the mouth and neck portion of the container, generally less than 45° with respect to the longitudinal axis of the container;

wherein said angled face of the blow nozzle is operative to engage the open mouth of the preform and bend the open mouth and neck portion of the preform to correspond to the angle of the face of the blow nozzle, and wherein said blow nozzle is operative to introduce high pressure air into the angled mouth and neck of the extended preform to stretch the extended preform into conformity with the shape of the blow mold and to provide a biaxially oriented container having an angled mouth and neck portion.

The container of the present invention comprises:

a biaxially oriented, blow molded container prepared from a straight, cylindrical preform or parison, said container having a closed base, a body portion extending from the closed base, a neck portion extending from the body portion, an open mouth, and a longitudinal axis; wherein said body portion has an upper portion and a lower portion, and in cross section one side of the upper body portion includes a gradual, continuous, curved configuration extending to the angled neck, and the opposed side of the upper portion has a stepped configuration extending to the angled neck.

The container of the present invention is desirably polyethylene terephthalate and may if desired include an amount of post consumer resin (PCR), for example, up to about 75%. Also, if desired the container may be of a multilayer construction. Desirably, the container may have a threaded neck and an outwardly extending flange in the neck portion beneath the threaded portion.

Other features and advantages of the present invention will appear hereinbelow.

BRIEF DESCRIPTION OF THE DRAWINGS

The present invention will be more readily understandable from a consideration of the following illustrative drawings, wherein:

FIG. 7 is a side view of the container of the present invention prepared in accordance with FIGS. 1–6, and FIGS. 7A & 7B are partial sectional views of the wall structure of the container.

DETAILED DESCRIPTION OF PREFERRED EMBODIMENTS

Figure 1:
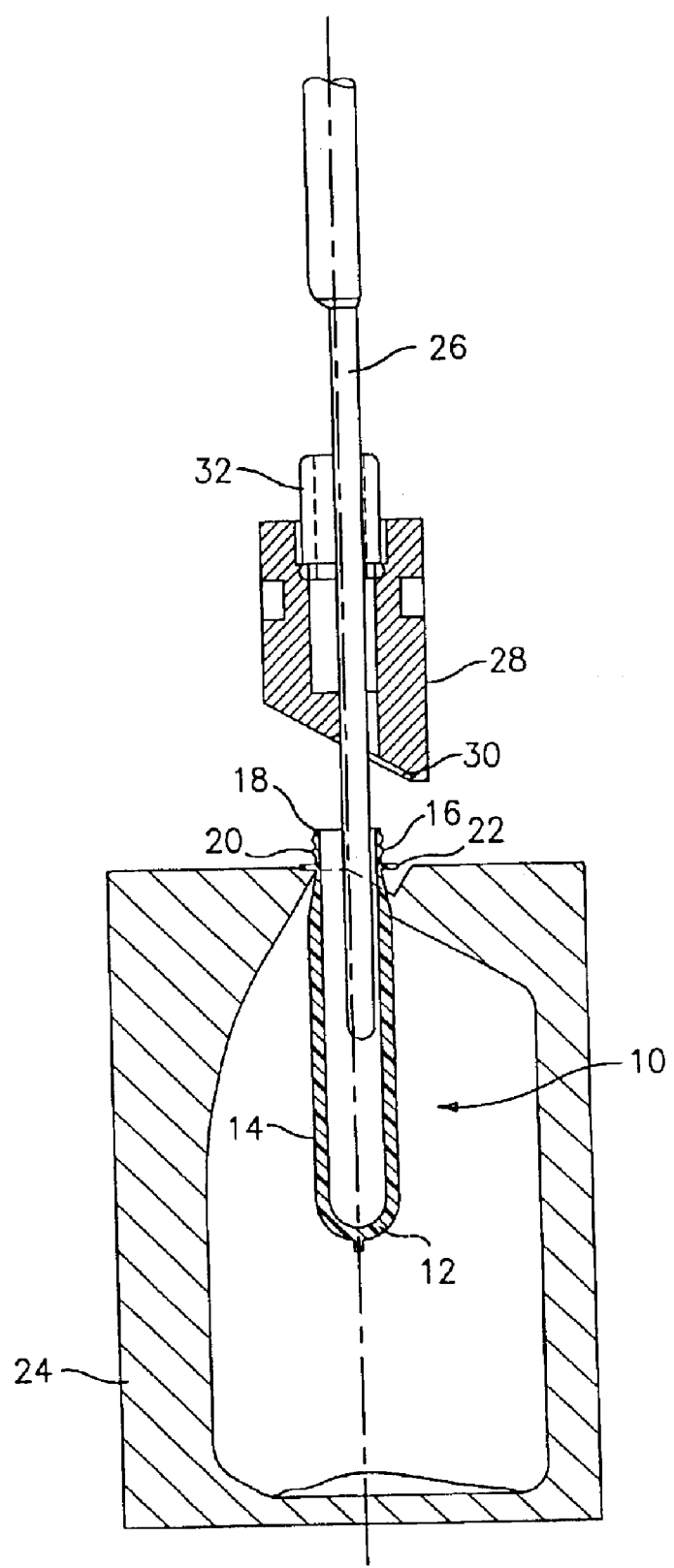
FIG. 1 is a side view showing the preform positioned in the blow mold, with the stretch rod positioned in the preform and the blow nozzle positioned above the blow mold.

Referring to the drawings, FIG. 1 shows a straight, cylindrical, plastic preform or parison 10 having a closed base 12, a straight body portion 14 extending therefrom, a straight neck portion 16 extending from the body portion, and an open mouth 18. If desired, the preform has a threaded neck portion 20 and an outwardly extending flange 22, which aids in seating the preform 10 in the blow mold 24. The blow mold 24 is closed on the preform firmly seating the preform in the blow mold.

Stretch rod 26 is positioned within the preform and blow nozzle 28 is spaced above the preform. It is noted from FIG. 1 that blow nozzle 28 has an angled face 30 which faces the preform, rather than the conventional flat face. Locking flange 32 is provided in the upper portion of the blow nozzle to lock the assembly in place.

Figure 2:
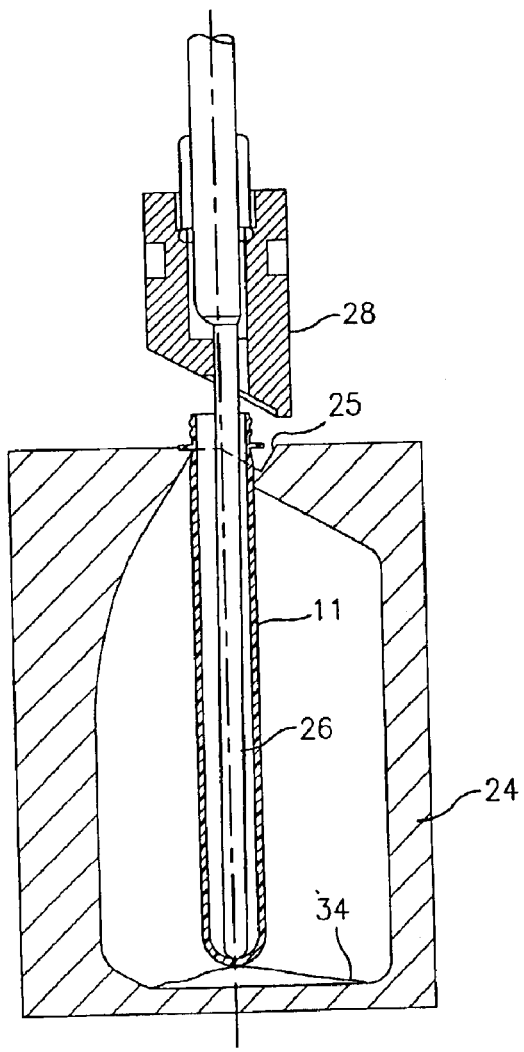
FIG. 2 is a view similar to FIG. 1 in a further stage of operation with the stretch rod extending the preform.
Figure 3:
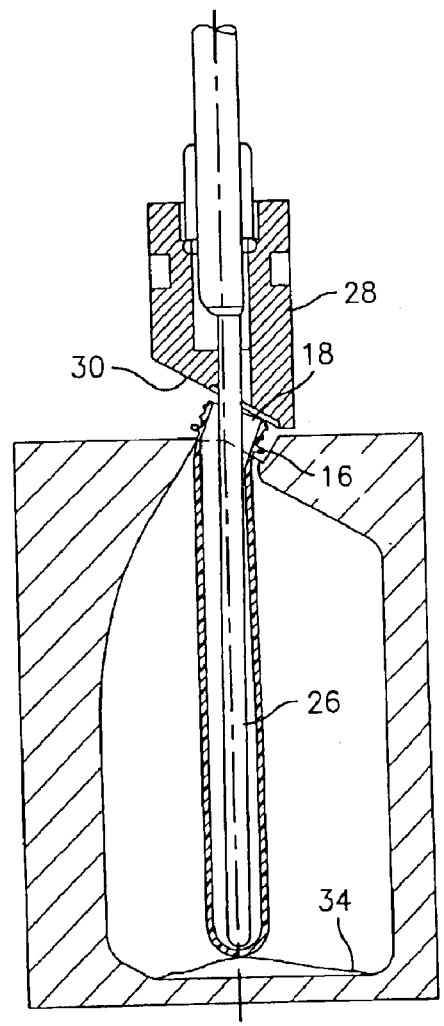
FIG. 3 is a view similar to FIG. 1 in a further stage of operation with the blow nozzle coming into engagement with the preform.
Figure 4:
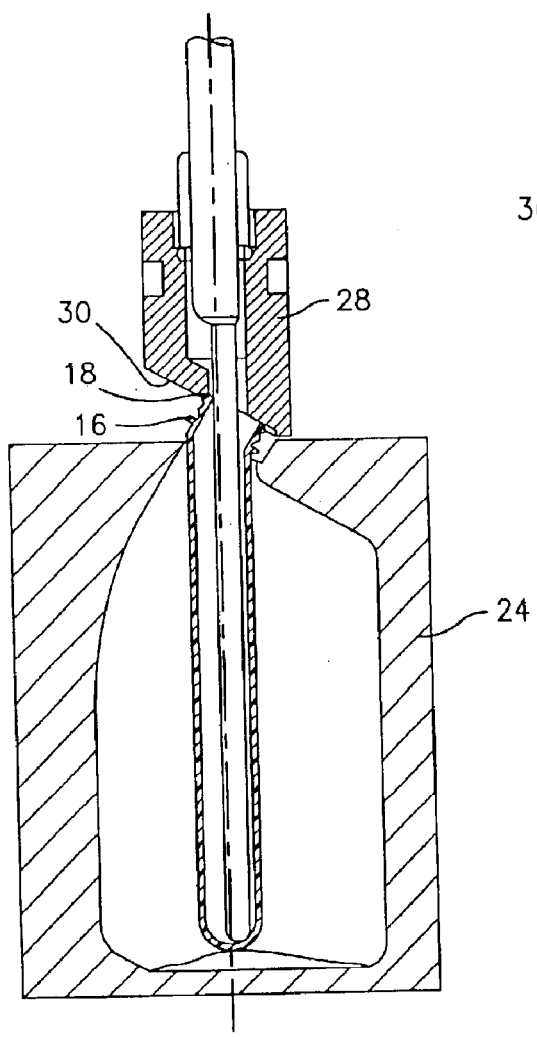
FIG. 4 is a view similar to FIG. 1 in a further stage of operation with the blow nozzle in full engagement with the preform and bending the mouth and neck portion of the preform into the desired angle.

FIG. 2 shows the stretch rod 26 fully extended in the clamped preform to extend the preform to the base 34 of the blow mold and to provide an extended preform 11, while FIG. 3 shows the angled face 30 of the blow nozzle 28 moving into engagement with the mouth 18 of the preform, commencing the bending of the mouth 18 and neck 16 of the extended preform 11 into the desired angled orientation. In FIG. 3, the angled face 30 of the blow nozzle 28 just starts to make contact with the open mouth 18 of the extended preform. It is noted that blow mold 24 includes an angled upper portion 25 to engage the outwardly extended flange 22 of the preform at an angle which corresponds to the angle of the face of the blow nozzle and to insure a proper angled open mouth and neck portion. In FIG. 4, the blow nozzle 28 continues downwardly, bending the open mouth 18 and neck portion 16 of the extended preform to an angular orientation which corresponds to the angle of the angled face 30 of the blow nozzle, i.e., less than 45° with respect to the longitudinal axis of the preform.

Figure 5:
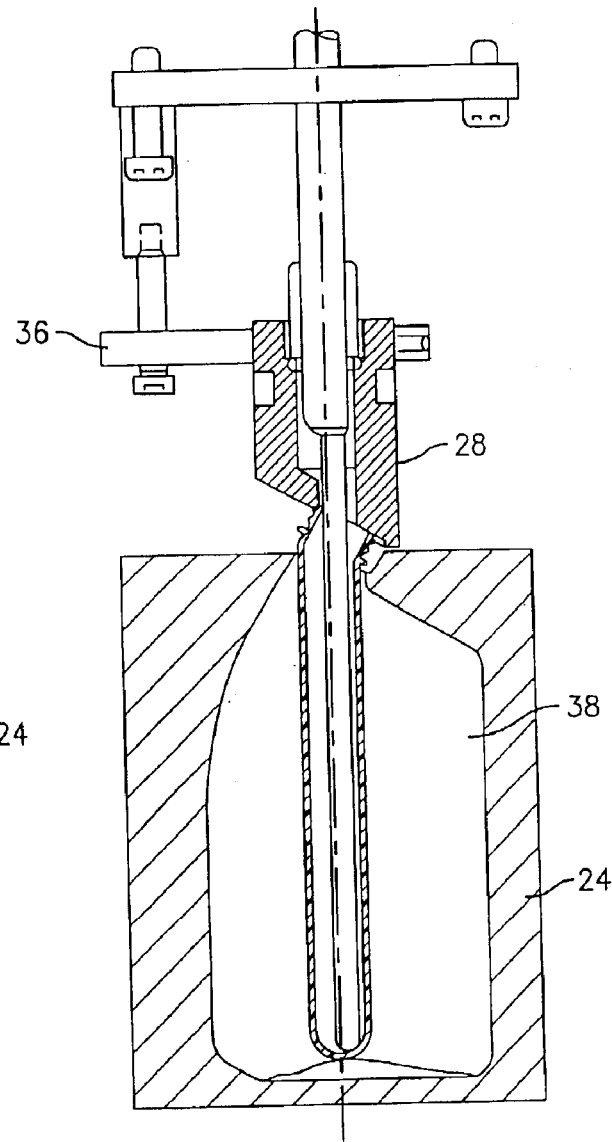
FIG. 5 is a view similar to FIG. 1 in a further stage of operation showing the blow nozzle in full engagement with the bent neck and mouth preform and with an anti-rotation arrangement to prevent rotation of the blow nozzle.

FIG. 5 shows anti-rotation element 36 to prevent rotation of blow nozzle 28. High pressure air is then introduced into the extended preform through the blow nozzle from a high pressure air source (not shown) to stretch the extended preform into conformity with cavity 38 of blow mold 24 and form container 40 shown in FIGS. 6–7.

Figure 6:
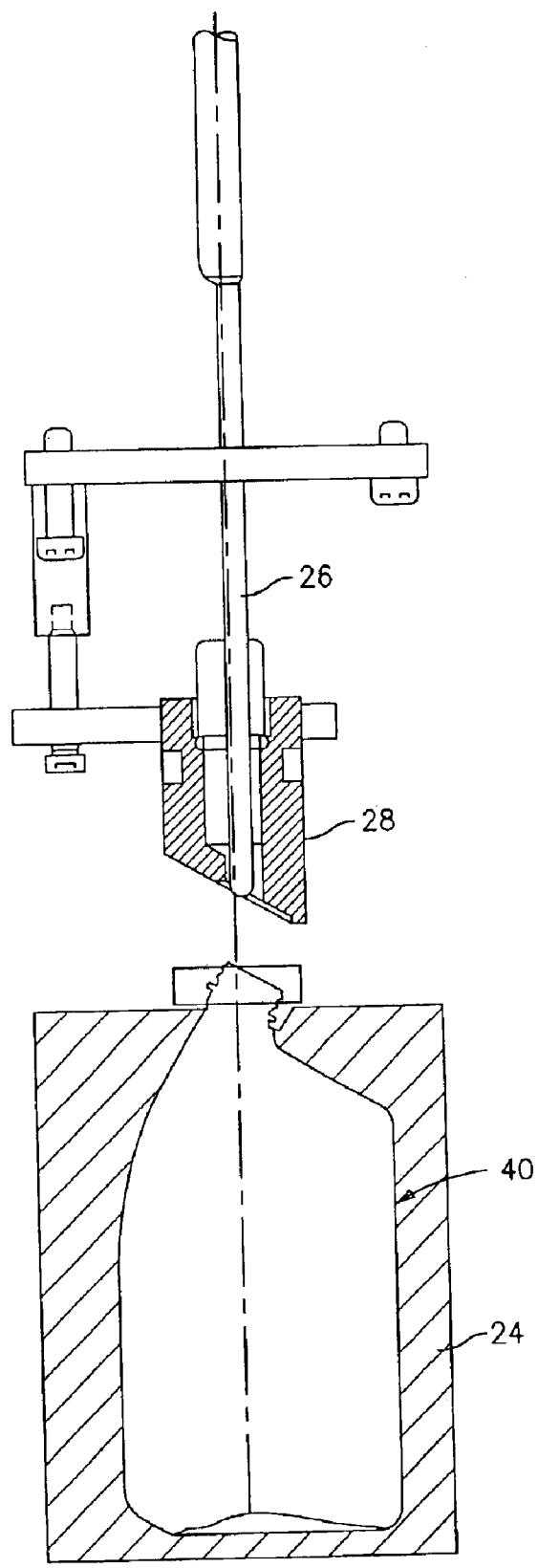
FIG. 6 is a view similar to FIG. 1 in a further stage of operation showing the final blow molded container with stretch rod and blow nozzle retracted therefrom.
Figure 6A:
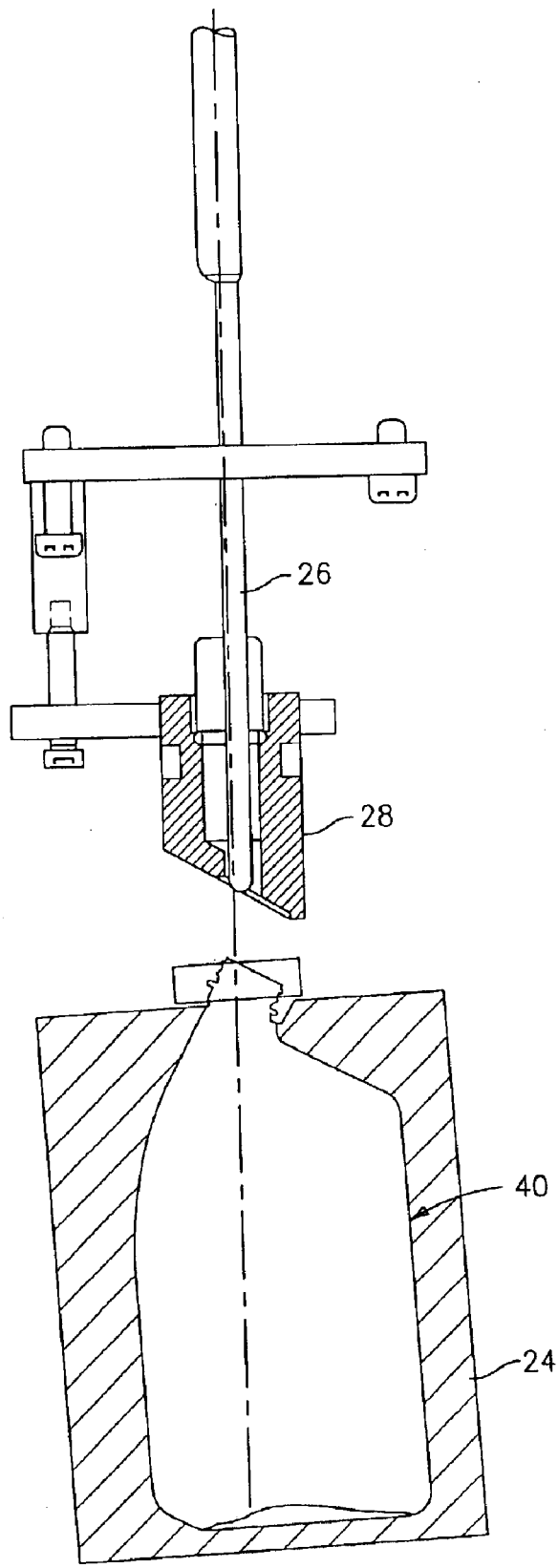
FIG. 6A is a modification of FIG. 6.

FIG. 6A is a variation of FIG. 6 and shows the mold and/or mold cavity placed at an angle of from 1 to 45° in relation to the stretch rod. In accordance with the variation of FIG. 6A, at least a portion of the mold cavity may conveniently be placed at said angle in relation to the stretch rod, and the preform appropriately processed at said angle.

As shown in FIG. 7, container 40 has a closed base 42, a body portion 44 extending from the closed base, a neck portion 46 extending from the body portion, and an open mouth 48. The neck portion and open mouth are at an angle of less than 45° with respect to the longitudinal axis 50 of the container 40. The container body portion 44 has an upper body portion 52 and a lower body portion 54. In cross-section, one side of the upper body portion includes a gradual, continuous curved configuration 56 extending to the curved neck, while the opposed side of the upper portion has a stepped configuration 58 extending to the curved neck. Container 40 also has a threaded neck 60 and outwardly extending flanges 62. In addition, the container is biaxially oriented. The container can have a multi-layer wall structure as shown in FIG. 7A, or a single layer wall structure as shown in FIG. 7B.

After completion of the blow molding operation, the stretch rod followed by the blow nozzle is retracted from the newly formed container, the blow mold is opened, and the newly formed container is removed.

Preferably, the plastic is polyethylene terephthalate; however, other suitable thermoplastic plastics may be readily used alone or in combination or in a multilayered configuration. For example, polyolefins, polyethylene naphthalate, polyvinyl chloride, and others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming a blow molded, plastic container with a mouth and neck portion thereof which is inclined or angled with respect to the body portion of the container, which comprises:

a blow mold having the desired container configuration for clamping or holding a straight, cylindrical plastic parison or preform having a closed base, straight body portion extending from the base, straight neck portion extending from the body portion, and open mouth;

a stretch rod associated with the blow mold for introduction into the preform operative to extend the preform substantially to the base of the blow mold and provide an extended preform; and a blow nozzle associated with the blow mold having an angled face corresponding to the desired angle of the mouth and neck portion of the container;

wherein said angled face of the blow nozzle is operative to engage the open mouth of the preform and bend the open mouth and neck portion of the preform to correspond to the angle of the face of the blow nozzle, and wherein said blow nozzle is operative to introduce high pressure air into the angled mouth and neck of the extended bent neck preform to stretch the extended bent neck preform into conformity with the shape of the blow mold and to provide a biaxially oriented container having an angled mouth and neck portion.

2. Apparatus according to claim 1, wherein the angled face of the blow nozzle is less than 45°, and wherein said angled face of the blow nozzle is operative to bend the open mouth and neck portion to a corresponding angle of less than 45°.

3. Apparatus according to claim 1, wherein the plastic preform is polyethylene terephthalate.

4. Apparatus according to claim 1, wherein the plastic parison contains post consumer resin.

5. Apparatus according to claim 1, wherein the plastic preform is a multilayered preform.

6. Apparatus according to claim 1, wherein the plastic preform includes a threaded neck portion and an outwardly extended flange portion beneath the threaded neck portion.

7. Apparatus according to claim 6, wherein the blow mold includes an angled portion corresponding to the angled face of the blow nozzle, wherein the angled face of the blow nozzle bends the open mouth and neck portion of the preform so that the outwardly extending flange of the preform engages the angled portion of the blow mold.

8. Apparatus according to claim 1, wherein the blow mold includes a mold cavity for receiving the parison, wherein the mold cavity is placed at an angle of from 1 to 45° with respect to the stretch rod.

* * * * *